Patented Mar. 23, 1954

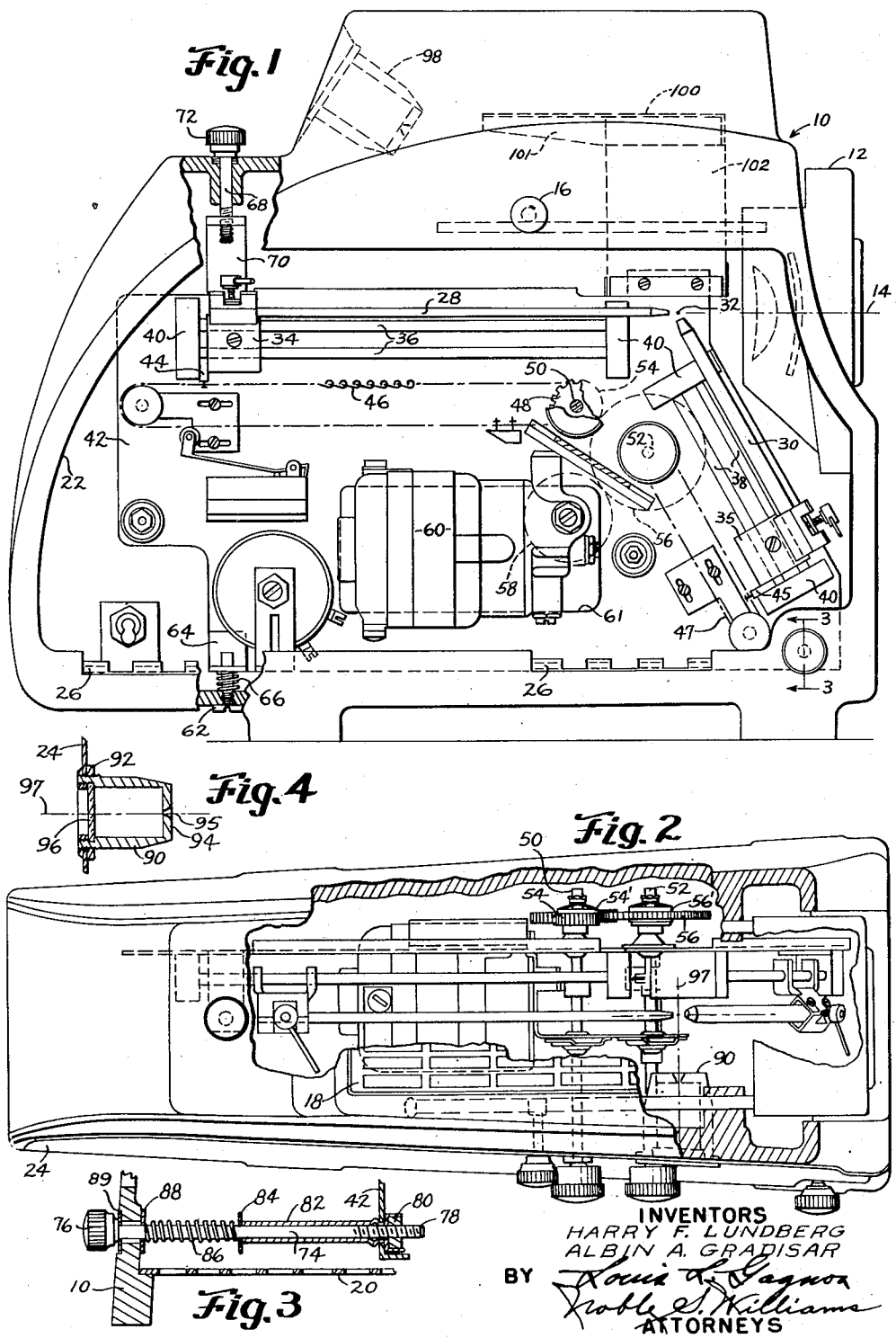

2,673,289

UNITED STATES PATENT OFFICE 2,673,289

ARC LAMP

Harry F. Lundberg, Johnsonburg, and Albin A. Gradisar, Snyder, N. Y., assignors to American Optical Company, Southbridge, Mass., a voluntary association of Massachusetts Application July 8, 1950, Serial No. 172,742

2 Claims. (Cl. 240—44.2)

This invention relates to arc lamps, and more particularly to means for adjustably positioning the operating mechanism for the lamp within a main housing and relative to an optical system carried thereby in such a manner that the electrodes which form and sustain the arc during operation of the lamp may be easily and accurately located relative to the optical axis of said system. The invention also comprises sighting means so constructed and arranged relative to the housing, the optical system and the operating mechanism of the lamp that said sighting means may serve as convenient means for aiding in properly locating the center of the arc relative to the optical axis of the system, in properly locating the center of the arc substantially at the point of intersection of the paths of travel of the electrodes, and in properly spacing the electrodes for best operating conditions for the lamp.

By providing means for readily adjustably positioning the operating mechanism for the lamp relative to the housing thereof and optical system carried thereby, and by providing suitable sighting means for determining the size and location of the arc, it is possible to employ less exacting tolerances in forming the various parts of the lamp and to use electrodes of different sizes, when desired, while still being able to easily and accurately locate this small highly concentrated light source properly in said lamp.

It is, accordingly, an object of the present invention to provide an arc lamp having an operating mechanism for establishing and maintaining an arc light source, an optical system for concentrating the light for illuminating purposes or the like, and means for supporting such mechanism within the housing of the lamp in an easily and readily adjustable manner so that said mechanism and the arc may be accurately located relative to the optical axis of said optical system.

It is, also, an object of the invention to provide upon a relatively fixed part or parts of said lamp efficient and inexpensive sighting means for viewing and aiding in adjusting the arc during operation of the lamp, and which sighting means may serve as a guide or guides for use in properly locating the arc relative to the optical system of the lamp.

Other objects and advantages of the invention will become apparent from the detailed description which follows when taken in conjunction with the accompanying drawing in which:

Fig. 1 is a side elevational view of an arc lamp embodying the invention, with certain parts thereof removed and other parts broken away to best show details thereof;

Fig. 2 is a plan view of the arc lamp of Fig. 1, with parts broken away to show the operative mechanism thereof;

Fig. 3 is a sectional view, of a part of the arc lamp of Fig. 1, and taken substantially upon section line 3—3 thereof; and Fig. 4 is a sectional view of the sighting means disclosed in Fig. 2.

Referring to Fig. 1 in detail, the numeral 10 indicates generally a hollow rigid housing for an arc lamp embodying the invention and in which is provided an optical system 12 adjacent the front end thereof. This optical system is preferably readily adjustable along an optical axis 14 by means of a rotatable control knob 16 and rack and pinion means of conventional construction connected therebetween for providing an illuminating beam of variable magnification. The housing 10 substantially completely encloses an operating mechanism provided for automatically actuating a pair of electrodes for sustaining an arc light source. The housing 10 is, however, provided with perforated grill 18 at the top thereof (see Fig. 2) and a foraminous partition 20 at the bottom thereof (see Fig. 3) for allowing circulation of cooling air through the lamp. Also, for convenience in operation of the lamp one side portion of the housing is provided with a relatively large opening 22 giving access to the interior of the housing and this opening is normally closed by a downwardly swinging cover 24 which overlies said opening. For clearness, this cover has been omitted from Fig. 1, but would normally be carried by hinge elements 26 shown therein. The pair of electrodes are shown at 28 and 30 and may be easily inserted or removed from the operating mechanism when the cover 24 is open.

It is well known that arc lamps provide extremely high intensity light sources of small size and accordingly are highly desirable for certain purposes such as in projection equipment, spot lights, photographic and scientific instruments and the like. They do, however, have the disadvantage of having the electrodes or carbons employed therein for sustaining the arc gradually consumed during operation of the lamp. Accordingly, these electrodes or carbons must be advanced by suitable means toward the arc in such a manner that the intensity of the arc will be continuously maintained substantially constant, notwithstanding the fact that at times and under certain conditions, the rate of consumption of the electrodes may vary, and even the rate of one may vary relative to the other. In the present invention, in order to advance the electrodes 28 and 30 automatically and as needed toward a common point of intersection 32 at which the arc is to be formed and maintained, there is provided a pair of electrode carriers 34 and 35 arranged to releasably grip the rear ends of the electrodes and to move same rectilinearly along separate paths toward said point. These carriers are arranged to slide upon pairs of guide rods, or the like, 36 and 38, and these rods are in turn supported by electrically non-conductive blocks 40 which are in turn screwed or otherwise secured to a vertically disposed longitudinally extending main frame or plate-like member 42. In the present construction, the movable carriers 34 and 35 may be connected by means of ceramic-bead-encased flexible conductors (not shown) to fixed terminals carried by plate 42 but electrically insulated therefrom.

The carriers 34 and 35 are in turn connected by projections 44 and 45, of electrically insulating material, to power-transmitting endless link chains 46 and 47 which extend about pairs of sprocket wheels 48 mounted upon transverse shafts suitably rotatably carried by plate 42. Two of these shafts, 50 and 52, have mounted upon adjacent ends thereof a pair of intermeshing gears 54 and 56 which are of such ratio relative to each other that when same are suitably rotated in opposite directions, by a driving gear 58 meshing with gear 56 and carried upon the drive shaft of a reduction gearing integral with electric motor 60, the carbons may be moved toward point 32 substantially at the rate at which they are normally consumed. Motor 60 is suitably secured to plate 42 with part of the motor casing projecting through a central aperture 61 in said plate for compactness. The opposite ends of shafts 50 and 52 are arranged to extend outwardly through openings in cover 24 and are provided with control knobs. These shafts are also provided with friction clutches 54' and 56', of known construction, so that either electrode may be readily moved forwardly or rearwardly as required for proper location relative to point 32.

It has been found highly desirable to position the operating parts just described upon main plate 42 and arrange this plate within housing 10 so that the point 32 may be elevated, or lowered, or moved from side to side as required to place the point 32 in coincidence with axis 14. For this reason, there is provided in a lower part of housing 10 a normally fixed stud 62 screw-threaded into a lower wall portion thereof so that its cylindrical upper end portion extends through an opening in a bracket 64 secured to and projecting laterally from the lower rear edge of plate 42. Between bracket 64 and the housing and surrounding said stud is positioned a compression spring 66. Substantially vertically disposed relative to stud 62 is a shaft 68 rotatably carried in a bore in an upper wall portion of housing 10 and a threaded lower end portion thereof is arranged in screw-threaded engagement with a bracket 70 extending upwardly and then laterally from an upper rear portion of plate 42. A control knob 72 is provided upon the upper end of this shaft so that rotation thereof may be employed to bodily raise or lower plate 42 and the operating mechanism and such carried thereby.

Since stud 62 and shaft 68 are in substantially vertical alignment, it will be clear that plate 42 may pivot about an axis through these parts and in so doing point 32 may be shifted laterally in either direction. Control means for so shifting the forward end of plate 42 laterally is shown in Figs. 1 and 3. This means comprises a relatively long shaft 74 having a control knob 76 on an outer end thereof and having its opposite end threaded to receive a nut 80. Nut 80 is encased in and held against rotation by an enlarged end portion of a tubular member 82 which extends through an opening in plate 42 and which is flared so as to engage opposite sides of the plate. The opposite end of tube 82 is in turn in engagement with a collar 84 on shaft 74 and compression spring 86 encircles this shaft and is arranged to bear against this collar and a collar 88 in engagement with the inside wall of housing 10. Another collar 89 on shaft 74 serves as an abutment at the outer surface of the housing 10 for engagement by control knob 76. In this manner, rotation of knob 76 may be used to move the lower front corner of plate 42 and thus point 32 laterally into the longitudinal vertical plane containing optical axis 14, said lateral movement being in effect a pivoting action of plate 42 about elements 62 and 68. Since the vertical movement and lateral movement of point 32 take place substantially at right angles to the optical axis 14, such movement will not materially change an adjustment of the optical system.

Since both electrodes are independently adjustable along their respective paths toward and away from point 32, and since electrodes of different diameters may be used at different times, and since parts adjacent point 32 are shiftable both laterally and vertically, it has been found desirable to provide upon a relatively fixed part or parts of the housing sighting means of simple and inexpensive construction which may be used while the arc lamp is in operation as guide means for indicating when the arc is of proper size as well as when the center thereof is in coincidence with optical axis 14. For such purposes, a tubular member 90 is provided in an opening formed in a side wall of the housing 10, in the present instance in the cover 24, said tubular member being held in position by a retaining ring 92 threaded thereon. In an inner transverse wall 94 of this tubular member is provided a pinhole or aperture 95 of suitable size, and at the opposite end of member 90 substantially flush with the cover 24 a ground glass screen 96 is provided which may have suitable reference marks (not shown) placed thereon to indicate the normal location of the ends of the electrodes as imaged thereon as well as the center point for the arc. Thus if aperture 95 and the screen in tubular member 90 are properly located in the side wall or cover and properly marked, there may be established thereby a transverse axis 97 which will pass through the optical axis 14, and preferably at right angles thereto, and since the reference marks on the screen 96 and the aperture 95 remain stationary at all times (when the cover 24 is in closed operative position) they may serve as convenient means for indicating proper adjustment and spacing of the electrodes as well as proper vertical adjustment of the movable plate 42. Similar sighting means may be used, if desired, in an upper rear wall of housing 10, as indicated at 98, and disposed in the vertical longitudinal plane containing the optical axis 14 so as to serve as convenient means for indicating whether or not the arc has been properly adjusted laterally into coincidence with the optical axis 14. Exact centering of the arc is highly desirable and even essential at certain times, such as for example, when the arc lamp is being employed as a light source for photomicrographic equipment using exceedingly high magnifications.

A light and draft shield for the arc is shown at 100 in Fig. 1 and in the preferred construction comprises an elongated imperforate top plate 101 and two side plates 102 extending downwardly from opposite sides thereof. This shield may be secured to and supported by an upper part of plate 42.

Having described our invention, we claim:

1. An arc lamp comprising a main housing, a light condensing optical system carried by said housing for projecting a concentrated beam of light forwardly of said housing along the optical axis of said system, a relatively long, thin, wide plate-like member longitudinally extending and vertically disposed within said housing so as to form a main supporting frame, electrode gripping and guiding means carried by said frame adjacent a side thereof and disposed so as to advance a pair of electrodes along separate paths toward a common point of intersection adjacent a forward portion of said frame when actuated, an electric motor and driving means carried by said frame and operatively connected to said electrode gripping and guiding means for actuating said electrodes toward said common point, means for adjustably positioning said frame and said electrode gripping and guiding means carried thereby relative to said optical axis, said positioning means comprising a first controllable means operatively connected to said frame and said housing for establishing a vertically extending pivotal axis adjacent a rear portion of said frame and substantially intersecting said optical axis, said last named means having a part extending outwardly of said housing and providing a control for adjustably moving said frame and said gripping and guiding means carried thereby along said pivotal axis to thereby cause said common point to move in a substantially vertical direction and a second controllable means operatively connected to a forward portion of said frame and to said housing and extending outwardly of said housing so as to provide a control for adjusting the position of the forward portion of said frame and said gripping and guiding means carried thereby laterally relative to said optical axis.

2. An arc lamp comprising a main housing, a light condensing optical system carried by said housing for projecting a concentrated beam of light forwardly of said housing along the optical axis of said system, a relatively long thin, wide plate-like member longitudinally extending and vertically disposed within said housing so as to form a main supporting frame, electrode gripping and guiding means carried by said frame adjacent a side thereof and disposed so as to advance a pair of electrodes along separate paths toward a common point of intersection adjacent a forward portion of said frame when actuated, an electric motor and driving means carried by said frame and operatively connected to said electrode gripping and guiding means for actuating said electrodes toward said common point, means for adjustably positioning said frame and said electrode gripping and guiding means carried thereby relative to said optical axis, said positioning means comprising a pivotal connection between said frame and said housing adjacent a lower rear portion of said frame and a pivotal connection between said frame and said housing adjacent an upper rear portion of said frame establishing a vertically extending pivotal axis substantially intersecting said optical axis, said upper pivotal connection having a part extending outwardly of said housing and providing a first controllable means for adjustably moving said frame and said gripping and guiding means carried thereby along said pivotal axis to thereby cause said common point to move in a substantially vertical direction, and a second controllable means operatively connected to a forward portion of said frame and to said housing and extending outwardly of said housing so as to provide a control for adjusting the position of the forward portion of said frame and said gripping and guiding means carried thereby laterally relative to said optical axis.

HARRY F. LUNDBERG.
ALBIN A. GRADISAR.

References Cited in the file of this patent

UNITED STATES PATENTS

| Number | Name | Date |
|---|---|---|
| 1,677,521 | Hall | July 17, 1928 |
| 2,216,352 | Mole et al. | Oct. 1, 1940 |
| 2,238,918 | Spear | Apr. 22, 1941 |
| 2,300,559 | Estey | Nov. 3, 1942 |
| 2,355,936 | Wolfe | Aug. 15, 1944 |

FOREIGN PATENTS

| Number | Country | Date |
|---|---|---|
| 299,704 | Germany | Oct. 31, 1919 |
| 407,155 | Great Britain | Mar. 15, 1934 |